(12) United States Patent
Sawaguchi

(10) Patent No.: US 8,677,185 B2
(45) Date of Patent: Mar. 18, 2014

(54) INFORMATION PROCESSING APPARATUS

(75) Inventor: Yuki Sawaguchi, Tsuchiura (JP)

(73) Assignee: Hitachi Metals, Ltd., Tokyo (JP)

( * ) Notice: Subject to any disclaimer, the term of this patent is extended or adjusted under 35 U.S.C. 154(b) by 360 days.

(21) Appl. No.: 13/246,450

(22) Filed: Sep. 27, 2011

(65) Prior Publication Data

US 2012/0079328 A1 Mar. 29, 2012

(30) Foreign Application Priority Data

Sep. 27, 2010 (JP) ................................. 2010-214806

(51) Int. Cl.
*G06F 11/34* (2006.01)
(52) U.S. Cl.
USPC .................... 714/37; 714/45; 714/51; 714/55
(58) Field of Classification Search
USPC ......................................... 714/37, 45, 51, 55
See application file for complete search history.

(56) References Cited

U.S. PATENT DOCUMENTS

| | | | |
|---|---|---|---|
| 2003/0154421 A1* | 8/2003 | Abe et al. ............................ | 714/2 |
| 2004/0003317 A1* | 1/2004 | Kwatra et al. .................... | 714/25 |
| 2008/0270827 A1* | 10/2008 | Brandyberry et al. .......... | 714/11 |

FOREIGN PATENT DOCUMENTS

| | | |
|---|---|---|
| JP | 11-053225 A | 2/1999 |
| JP | 11-065898 A | 3/1999 |
| JP | 11-161519 A | 6/1999 |
| JP | 2003-330575 A | 11/2003 |
| JP | 2007-094537 A | 4/2007 |
| JP | 2008-293420 A | 12/2008 |
| JP | 2009-211625 A | 9/2009 |

OTHER PUBLICATIONS

Japanese Office Action dated Sep. 25, 2012 (and English translation thereof) in counterpart Japanese Application No. 2010-214806.

* cited by examiner

*Primary Examiner* — Chae Ko
(74) *Attorney, Agent, or Firm* — Holtz, Holtz, Goodman & Chick

(57) ABSTRACT

A CPU (1) of an information processing apparatus (8) executes software stored in a DRAM (7). A watchdog timer (2) monitors the operation of the software. A hardware monitoring device (4) monitors the state of hardware provided in the information processing apparatus (8). Results of the monitoring are managed by a management LSI chip (3). A non-volatile memory (6) is where failure information is saved. If no watchdog toggles are received for a given period of time, the watchdog timer (2) notifies the CPU (1) with an NMI signal and starts the second round of time counting. The CPU (1) collects failure information from the management LSI (3). The CPU (1) is rebooted through cold reset when failure information collection is completed, and through hot reset when failure information collection is incomplete. In the case of hot reset, the CPU (1) collects failure information after rebooted.

4 Claims, 3 Drawing Sheets

INFORMATION PROCESSING APPARATUS

BACKGROUND OF THE INVENTION

1. Field of the Invention

The present invention relates to an information processing apparatus and, more particularly, to an information processing apparatus that includes a built-in watchdog timer.

2. Description of the Related Art

This type of information processing apparatus uses a central processing unit (CPU) to execute software necessary for the apparatus to operate. The watchdog timer monitors the operation of the software and, in the case where the software operation stops, resets the CPU. This mechanism is implemented with the use of a notification called a watchdog toggle. Specifically, the CPU periodically sends a watchdog toggle notification to the watchdog timer while the software is running. If the software stops for some reason, the watchdog toggle notification from the CPU ceases. After a given period of time during which there is no watchdog toggle notification, the watchdog timer commands the CPU to reset. Receiving the command, the CPU reboots and executes the software anew. The information processing apparatus thus recovers to normal operation.

Although resetting by the watchdog timer enables the information processing apparatus to recover to normal operation, this does not allow the information processing apparatus to retain information such as what process or which application has been executed by the CPU and the operation states of other hardware components than the CPU at the time of the reset. Therefore, when the cause of failure is to be identified later, a user of the information processing apparatus needs to manually collect necessary information and deal with the subsequent recovery process.

SUMMARY OF THE INVENTION

The present invention disclosed and claimed herein, in one aspect thereof, comprises an information processing apparatus. The information processing apparatus comprises a CPU which executes software necessary for the information processing apparatus to operate and which keeps outputting a monitoring notification to a monitor while the software is running; a management device which monitors states of hardware components built in the information processing apparatus other than the CPU, and which manages results of the monitoring as failure information; a memory device which saves the failure information managed by the management device; and a watchdog timer which serves as the monitor of the CPU and which starts an initial round of time counting for monitoring after booting to monitor operation of the CPU in executing the software, based on the monitoring notification received from the CPU.

When receiving no monitoring notification in a given period of time during the monitoring of the CPU, the watchdog timer notifies the CPU with an interrupt signal and starts counting time anew as a second round of time counting for monitoring. As a result, the CPU notified with the interrupt signal starts a collection process in which the failure information is collected from the management device and the collected failure information is saved in the memory device. After the start of the collection process, when the monitoring notification which the watchdog timer is supposed to receive from the CPU stops because the CPU has completed the collection process and the management device accordingly has notified the CPU of the completion of collection, the watchdog timer issues a first reset command to the CPU and the management device after a given period of time to reboot the CPU so that the rebooted CPU performs a first reset operation in which the failure information is not collected from the management device. When, as opposed to the issuing of the first reset command, the watchdog timer does not receive the monitoring notification from the CPU in the given period of time with the collection process by the CPU incomplete, the watchdog timer issues a second reset command to the CPU and the management device to reboot the CPU so that the rebooted CPU performs a second reset operation in which the failure information collected from the management device is saved in the memory device.

A wider application range of the present invention will become clear from the detailed description given below. While the detailed description and embodiments describe preferred modes of carrying out the present invention, these are given for illustration only, and various modifications and improvements that can be made without departing from the spirit and scope of the present invention are obvious to those skilled in the art.

BRIEF DESCRIPTION OF THE DRAWINGS

The present invention will be understood more completely from the detailed description given below and accompanying drawings. The accompanying drawings are shown by way of illustration and are not to limit the present invention. In the accompanying drawings.

DETAILED DESCRIPTION

Figure 1:
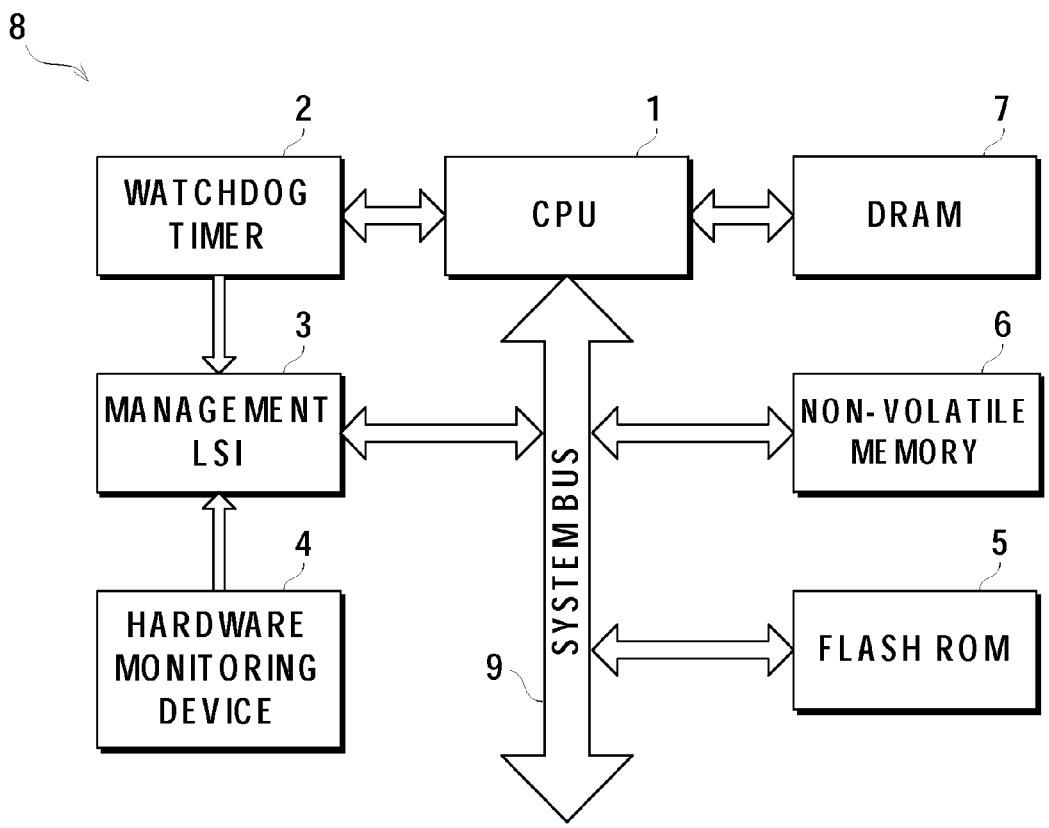
FIG. 1 is a block diagram schematically illustrating the configuration of an information processing apparatus according to an embodiment of the present invention.

FIG. 1 is a block diagram schematically illustrating the configuration of an information processing apparatus 8. The information processing apparatus 8 is computer hardware installed as an embedded system in some electronic device. Electronic devices in which the information processing apparatus 8 is installed are, for example, network relay devices, media converters, and switching hubs, but are not limited to these examples.

The information processing apparatus 8 includes, in addition to a CPU 1, a watchdog timer 2, a dynamic random access memory (DRAM) 7, a management large scale integration (LSI) chip 3 (hereinafter referred to as management LSI 3), a hardware monitoring device 4, a flash read only memory (ROM) 5, a non-volatile memory 6, and others.

The various hardware components built in the information processing apparatus 8 are configured in the following manner:

The DRAM 7 and the watchdog timer 2 are connected to the CPU 1 by their respective dedicated hard wires (not denoted by reference symbols in the drawing). The watchdog timer 2 is also connected to the management LSI 3 by a dedicated hard wire (not denoted by a reference symbol in the drawing). The management LSI 3, the flash ROM 5, and the non-volatile memory 6 are connected to the CPU 1 via a system bus 9 of the CPU 1. The hardware monitoring device 4 is connected to the management LSI 3 by a dedicated hard wire (not denoted by a reference symbol in the drawing).

The CPU 1 reads and executes, for example, software stored in the flash ROM 5. Program modules necessary for the information processing apparatus 8 to operate are incorporated in the software. The information processing apparatus 8 implements functions suited to its purpose of use by having the CPU 1 execute the software.

The software also causes a watchdog toggle to be output to the watchdog timer 2 from the CPU 1. While in operation, the software keeps outputting a watchdog toggle. The watchdog timer 2 uses the output of watchdog toggles to monitor for whether or not the software is operating normally. The watchdog timer 2 starts the initial round of time counting as soon as the information processing apparatus 8 is booted up.

During the normal execution of the software by the CPU 1, in other words, while the information processing apparatus 8 is in operation, an operator operates, for example, a reset switch (not shown), to intentionally generate a reset signal, causing the software to stop outputting watchdog toggles. Then the watchdog timer 2 fails to receive a watchdog toggle in a given period of time and therefore outputs a reset command to the CPU 1.

On the other hand, when the operation of the software goes wrong for some reason, for example, thermal runaway of the CPU 1, the normal output of watchdog toggles from the software ceases. In this case, too, the watchdog timer 2 fails to receive a watchdog toggle in the given period of time, accordingly determines that the software is not functioning normally, and notifies the CPU 1 with a non-maskable interrupt (NMI) signal. The CPU 1 can thus receive a non-maskable interrupt signal normally even when the CPU 1 is currently in a status that prohibits interruption. If the CPU 1 is provided with an NMI terminal, the information processing apparatus 8 may take a mode in which an interrupt signal from the watchdog timer 2 is input to the NMI terminal.

Receiving the NMI signal, the CPU 1 outputs a watchdog toggle again to the watchdog timer 2. The watchdog timer 2 receives this watchdog toggle and starts the second round of time counting. In the case where the watchdog timer 2 subsequently fails to receive a watchdog toggle in the given period of time, the watchdog timer 2 outputs a reset command.

The watchdog timer 2 can use different types of reset commands suited to different situations. Specifically, the watchdog timer 2 can output one of two types of reset commands, a first reset command "cold reset" and a second reset command "hot reset," that suits the situation at present.

Of the two types of reset commands, "cold reset" is a command that allows a process executed upon the occurrence of a failure to delete failure information recorded in the management LSI 3. The other reset command "hot reset" is a command that enables the CPU 1 to collect failure information after reboot by saving, instead of deleting, failure information recorded in the management LSI 3. The process executed upon the occurrence of a failure using these "cold reset" and "hot reset" commands are described later in detail with reference to other drawings, specifically, flow charts.

The hardware monitoring device 4 monitors all the time the states of matters that can be monitored (for example, drive voltage and clock cycle) about a power source, a clock, and other various hardware components built in the information processing apparatus 8, and notifies results of the monitoring to the management LSI 3.

The management LSI 3 manages all the time monitoring results from the hardware monitoring device 4, and enters notified monitoring results in an internal register (not shown).

The flash ROM 5 stores the software executed by the CPU 1 as described above. The CPU 1 reads the software out of the flash ROM 5 and executes the software at the time of booting.

The non-volatile memory 6 saves failure information collected by the CPU 1 from the management LSI 3 upon the occurrence of a failure.

Figure 2:
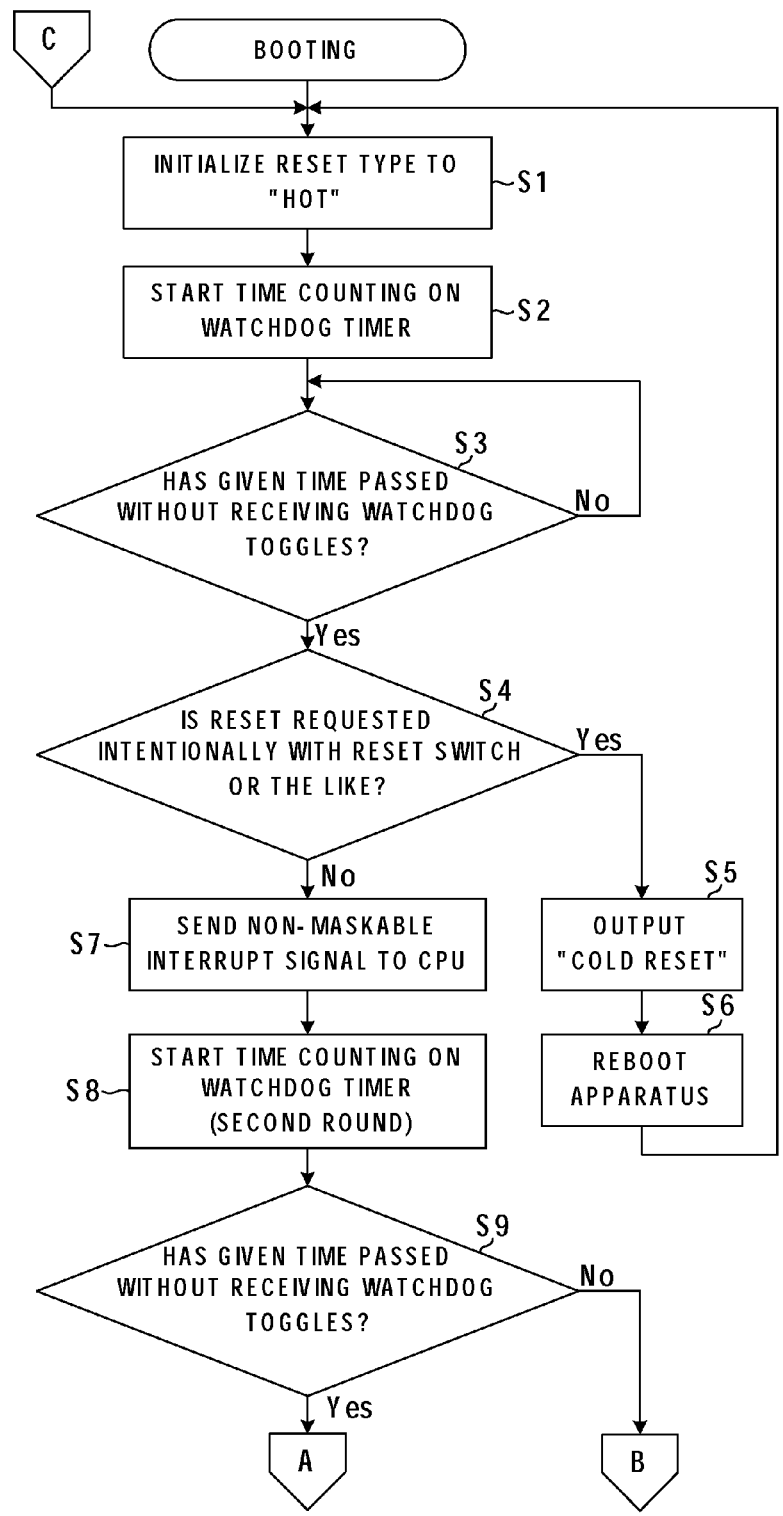
FIG. 2 is a first half (½) of a series of flow charts illustrating the order of operation steps taken after the information processing apparatus is booted up.
Figure 3:
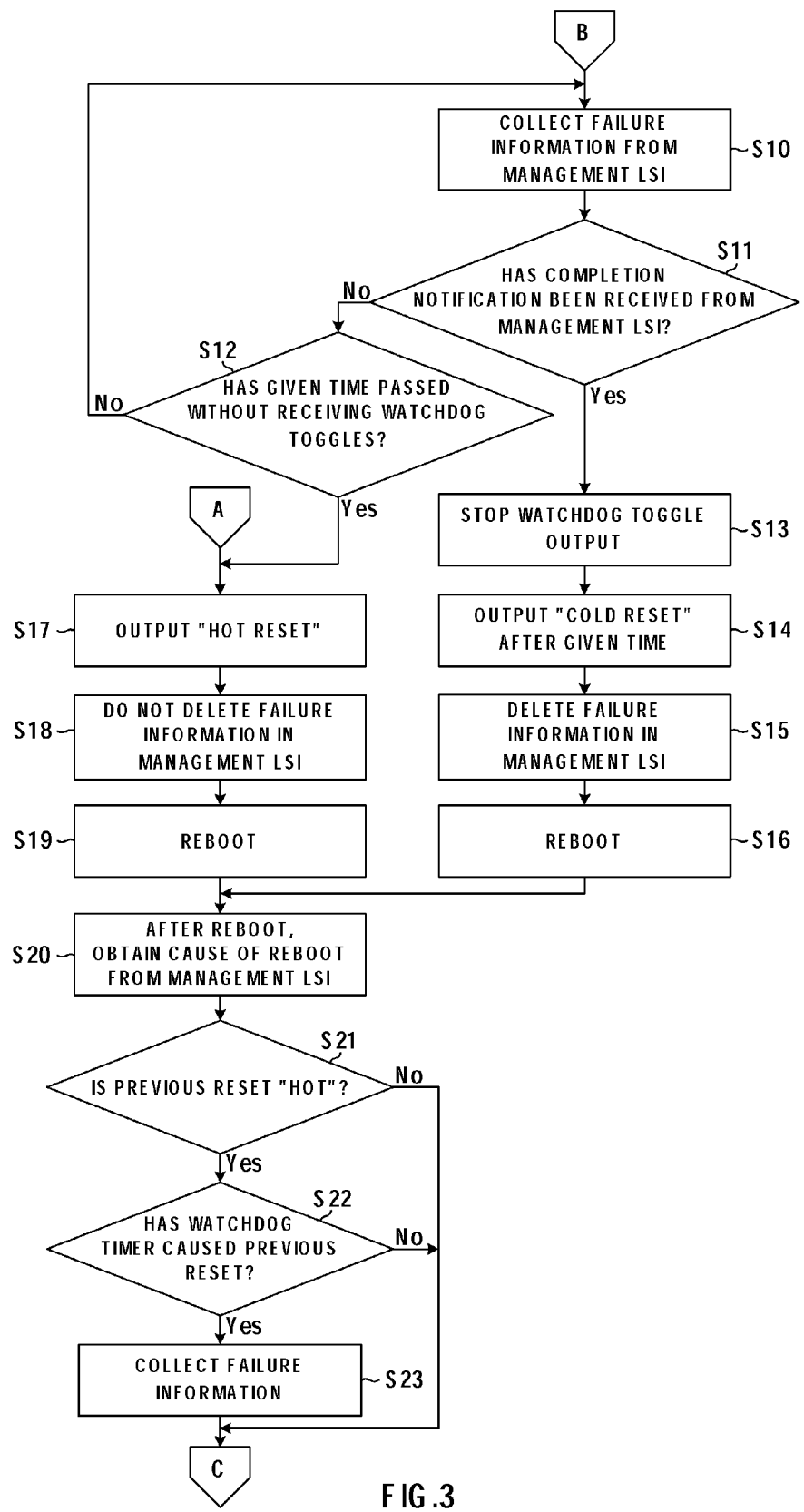
FIG. 3 is a latter half (½) of the series of flow charts illustrating the order of operation steps taken after the information processing apparatus is booted up.

FIGS. 2 and 3 are a series of flow charts illustrating the order of operation steps taken after the information processing apparatus 8 is booted up.

When the information processing apparatus 8 is booted up, the watchdog timer 2 first sets the default reset type to "hot reset" (S1). This allows, in principle, the information processing apparatus 8 to retain failure information in the event that the information processing apparatus 8 reboots unexpectedly, for example.

Next, the software is read to the CPU 1 and executed normally, thereby starting the output of watchdog toggles from the CPU 1 to the watchdog timer 2. Receiving a watchdog toggle, the watchdog timer 2 starts the initial (first) round of time counting (S2).

While the software is in normal operation, the watchdog timer 2 monitors the operation of the software based on watchdog toggles. Specifically, in the case where a watchdog toggle is received from the CPU 1 within a given period of time (for example, several milliseconds to several tens milliseconds) (S3: No), the watchdog timer 2 clears the time count up to that point (the timer cannot be stopped) and resumes counting from the initial value.

If the output of watchdog toggles stops for the given period of time for some reason, the watchdog timer 2 completes counting time (S3: Yes). In the case where the cause of the cessation of watchdog toggle output is intentional (S4: Yes), such as a user operating a reset switch, the watchdog timer 2 outputs "cold reset" (S5) and the information processing apparatus 8 reboots (S6). After the reboot, the watchdog timer 2 repeatedly executes the steps described above (S1 to S3).

[Process Executed upon Failure]

On the other hand, in the case where some failure in the information processing apparatus 8 is the cause instead of intentional operation of a reset switch, a process described below is executed in this embodiment. However, the following process is not the only option.

In the case where the cause of the cessation of watchdog toggle output for the given period of time is not intentional (S4: No), the watchdog timer 2 notifies the CPU 1 with an NMI signal (S7). Receiving the NMI signal, the CPU 1 outputs a watchdog toggle again to the watchdog timer 2. Receiving the watchdog toggle, the watchdog timer 2 starts the second round of time counting (S8).

After starting the second round, the watchdog timer 2 continues to monitor the operation of the software based on watchdog toggles. While a watchdog toggle is kept output (S9: No), the CPU 1 executes a process of collecting failure information from the management LSI 3 (collection process). The collected failure information is saved in the non-volatile memory 6 (from a connection marker B of FIG. 2 to a connection marker B of FIG. 3: S10 of FIG. 3, S12: No).

[In the Case Where Failure Information Collection is Completed]

When the failure information collection process executed by the CPU 1 is completed normally, the management LSI 3 notifies the CPU 1 of the completion of collection (S11: Yes). The CPU 1 subsequently stops outputting watchdog toggles (S13). After a given period of time passes, the watchdog timer 2 outputs "cold reset" to the CPU 1 and the management LSI 3 (S14).

When the type of the reset command is "cold reset" as described above, failure information within the management LSI 3 is deleted (S15) and then the CPU 1 reboots (S16).

[In the Case where Failure Information Collection is Incomplete]

A contrasting case is discussed where the watchdog toggle output ceases for a given period of time (S12: Yes) after the watchdog timer 2 starts the second round of time counting and before the completion of collection is notified from the management LSI 3 (S11: No). In this case, the watchdog timer 2 outputs "hot reset" to the CPU 1 and the management LSI 3 (S17). The same applies also to the case where the watchdog toggle output ceases for a given period of time before the CPU 1 proceeds to the failure information collection process (S9: Yes) (from a connection marker A of FIG. 2 to a connection marker A of FIG. 3).

When the type of the reset command is "hot reset" as described above, failure information within the management LSI 3 is not deleted (S18) and then the CPU 1 reboots (S19).

[Failure Information Collection after Reboot]

The specifics of processing executed after the CPU 1 reboots vary as follows, depending on whether the type of the previous reset command is "cold reset" or "hot reset."

[In the Case of Cold Reset]

After the reboot, the CPU 1 checks the type of a reset command that has been executed in the previous reboot based on information saved in the management LSI 3 (S20). In the case where the type of the reset command is "cold reset," the CPU 1 does not execute the processing of collecting failure information (S21: No). Then the processing is resumed from the step that is taken immediately after the booting of the information processing apparatus 8 (from a connection marker C of FIG. 3 to a connection marker C of FIG. 2: a return to S1 of FIG. 2). Because the failure information collection process is already completed in this case, the rebooted CPU 1 does not need to execute extra processing through the software. In this manner, the load of the CPU 1 is lessened and the essential operation of the software can be resumed quickly.

[In the Case of Hot Reset]

The case where the type of the reset command is "hot reset" (S21: Yes) and the cause of reboot is the completion of time counting by the watchdog timer 2 (S22: Yes) is discussed. The CPU 1 in this case determines that failure information collection is incomplete, and collects failure information in the management LSI 3 (S23). Then the processing is resumed from the step that is taken immediately after the booting of the information processing apparatus 8 (from the connection marker C of FIG. 3 to the connection marker C of FIG. 2: return to S1 of FIG. 2). In this manner, failure information can be collected after reboot even when the CPU 1 reboots without completing failure information collection.

The information processing apparatus 8 of this embodiment counts time on the watchdog timer 2 in two stages, that is, the initial round of time counting and the second round of time counting, and uses two types of reset commands, thereby accomplishing automatic collection of failure information upon the occurrence of a failure and secure saving of the collected failure information.

The information processing apparatus 8 is also capable of collecting failure information without missing any pieces because the hardware monitoring device 4 monitors all the time the state of hardware within the information processing apparatus 8 and the management LSI 3 manages all the time information from the hardware monitoring device 4.

The watchdog timer 2 notifies the CPU 1 with an NMI signal if there is no watchdog toggle notification in a given period of time. Receiving the NMI signal, the CPU 1 outputs a watchdog toggle again to the watchdog timer 2, and the watchdog timer 2 starts the second round of time counting. This prevents the CPU 1 from rebooting immediately and makes subsequent failure information collection possible. Thus, outputting "cold reset" in the case where failure information collection is completed saves the trouble of repeating failure information collection upon reboot. In the case where failure information collection is incomplete, outputting "hot reset" ensures that failure information is collected after reboot.

The present invention includes another embodiment in which, unlike the embodiment described above, the hardware monitoring device 4 and the management LSI 3 are not two separate components. The other embodiment may employ, for example, a voltage monitoring LSI chip capable of measuring voltage as a single device that has the function of the hardware monitoring device 4 and the function of the management LSI 3 both. In this case, the number of parts is reduced and the hardware configuration is simplified.

The information processing apparatus 8 is also applicable to other uses than an embedded system.

What is claimed is:

1. An information processing apparatus comprising:
   (a) a CPU which executes software necessary for the information processing apparatus to operate and which keeps outputting a monitoring notification to a monitor while the software is running;
   (b) a management device which monitors states of hardware components built in the information processing apparatus other than the CPU, and which manages results of the monitoring as failure information;
   (c) a memory device which saves the failure information managed by the management device; and
   (d) a watchdog timer which serves as the monitor of the CPU and which starts an initial round of time counting for monitoring after booting to monitor operation of the CPU in executing the software, based on the monitoring notification received from the CPU, the watchdog timer being configured to:
      (d-1) when receiving no monitoring notification in a given period of time during the monitoring of the CPU, notify the CPU with an interrupt signal and start counting time anew as a second round of time counting for monitoring so that the CPU notified with the interrupt signal starts a collection process in which the failure information is collected from the management device and the collected failure information is saved in the memory device;
      (d-2) after the start of the collection process, when the monitoring notification which the watchdog timer is supposed to receive from the CPU stops because the CPU has completed the collection process and the management device accordingly has notified the CPU of the completion of collection, issue a first reset command to the CPU and the management device after a given period of time to reboot the CPU so that the rebooted CPU performs a first reset operation in which the failure information is not collected from the management device; and
      (d-3) after the start of the collection process, when, as opposed to the issuing of the first reset command, the watchdog timer does not receive the monitoring notification from the CPU in the given period of time with the collection process by the CPU incomplete, issue a second reset command to the CPU and the management device to reboot the CPU so that the rebooted CPU performs a second reset operation in which the failure information collected from the management device is saved in the memory device.

2. An information processing apparatus according to claim 1, wherein the management device monitors the states of the hardware components all the time and manages results of the monitoring all the time as failure information.

3. An information processing apparatus according to claim 1,
   wherein, when there is no monitoring notification in the given period of time during the monitoring of the CPU, the watchdog timer notifies the CPU with a non-maskable interrupt signal, and
   wherein, notified with the non-maskable interrupt signal, the CPU outputs anew the monitoring notification to the watchdog timer so that the watchdog timer starts the second round of time counting for monitoring.

4. An information processing apparatus according to claim 1, wherein the management device comprises:
   a hardware monitoring device which monitors states of hardware components built in the information processing apparatus; and
   a management LSI chip which manages results of the monitoring by the hardware monitoring device.

* * * * *